United States Patent [19]

Schiavone

[11] 4,235,184

[45] Nov. 25, 1980

[54] STRAPPING, SEAL AND COUNTERWEIGHT DEVICE FOR MOUNTING TIRE PRESSURE WARNING SYSTEM SENSORS ON TIRE RIMS

[75] Inventor: Ben M. Schiavone, Cortland, Ohio

[73] Assignee: Sharon Steel Corporation, Sharon, Pa.

[21] Appl. No.: 23,153

[22] Filed: Mar. 23, 1979

[51] Int. Cl.³ .................................................. B60C 23/04
[52] U.S. Cl. .................................. 116/34 R; 152/379.5; 340/58
[58] Field of Search .......................... 116/34 R, 34 B; 73/146.4, 146.5; 301/5 B; 152/330 R, 330 A, 330 D, 375, 379.1; 340/58

[56] References Cited

U.S. PATENT DOCUMENTS

| | | | |
|---|---|---|---|
| 1,160,222 | 11/1915 | Wagenhorst | 301/5 B |
| 1,352,005 | 9/1920 | Larsson | 301/5 B |
| 3,154,048 | 10/1964 | Nue | 73/146.2 X |
| 3,305,903 | 2/1967 | McMahon | 152/330 X |
| 3,818,435 | 6/1974 | Hill et al. | 340/58 |
| 3,835,451 | 9/1974 | Church | 340/58 |
| 4,077,453 | 3/1978 | French et al. | 152/379.1 X |
| 4,117,452 | 9/1978 | Snyder et al. | 340/58 |
| 4,159,730 | 7/1979 | Osada et al. | 152/381.1 X |

Primary Examiner—Daniel M. Yasich
Attorney, Agent, or Firm—Frease & Bishop

[57] ABSTRACT

A mounting device is provided for mounting a low tire pressure sensor of known type, which may include a deflectable finger and a self-contained and powered ratio transmitter, on the tire rim of a vehicle wheel. The mounting device consists of three simple coordinated metal strapping, strapping seal and counterweight components. The seal is mounted on the counterweight. To install the mounting device, the strapping is engaged with the sensor and ends of the strapping are overlapped and sealed by the seal. To complete the installation the strapping is tensioned around the wheel rim by strapping and sealing tools. When installed, the strapping holds the sensor and counterweight in predetermined fixed positions on the rim within a tire mounted on the rim at all reasonable wheel speeds.

14 Claims, 19 Drawing Figures

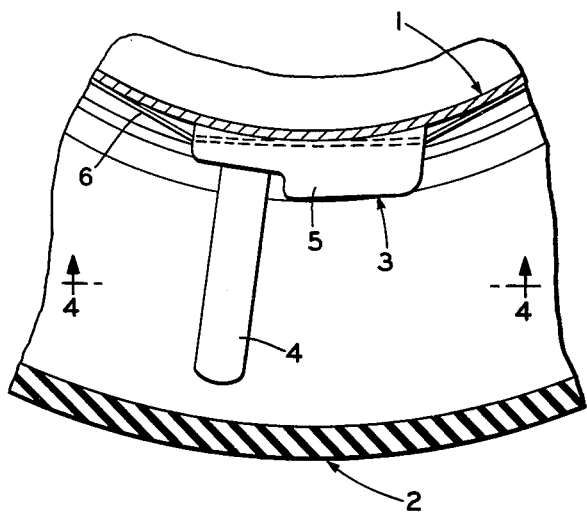
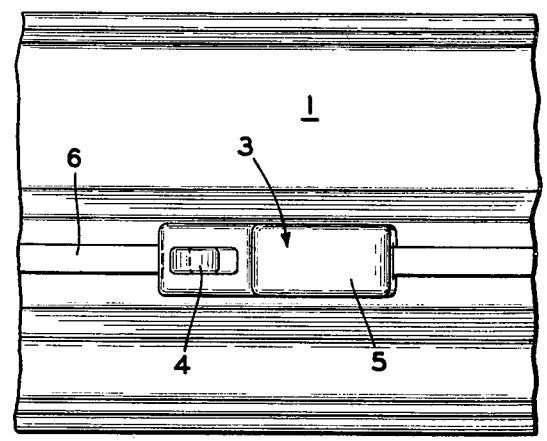
FIG.3  FIG.4
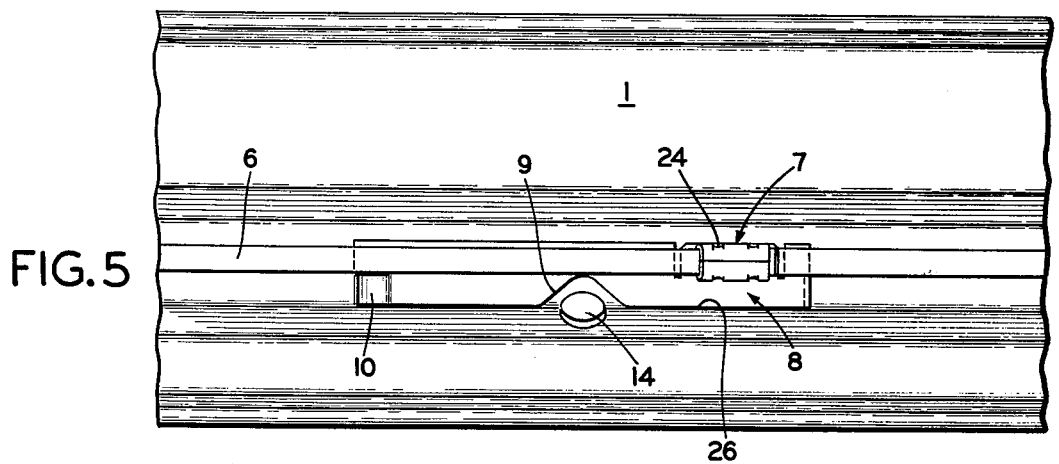
FIG.5
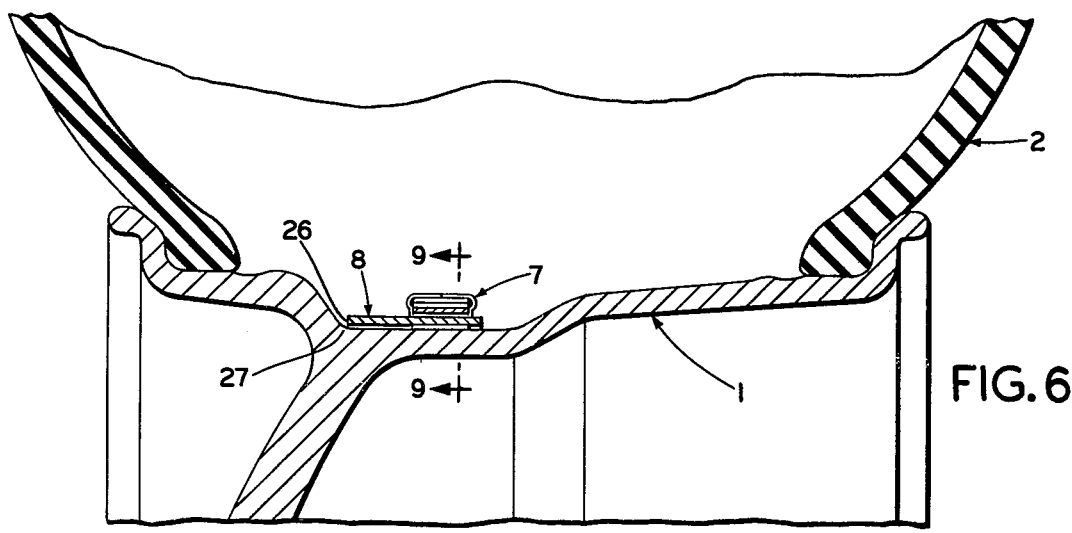
FIG.6

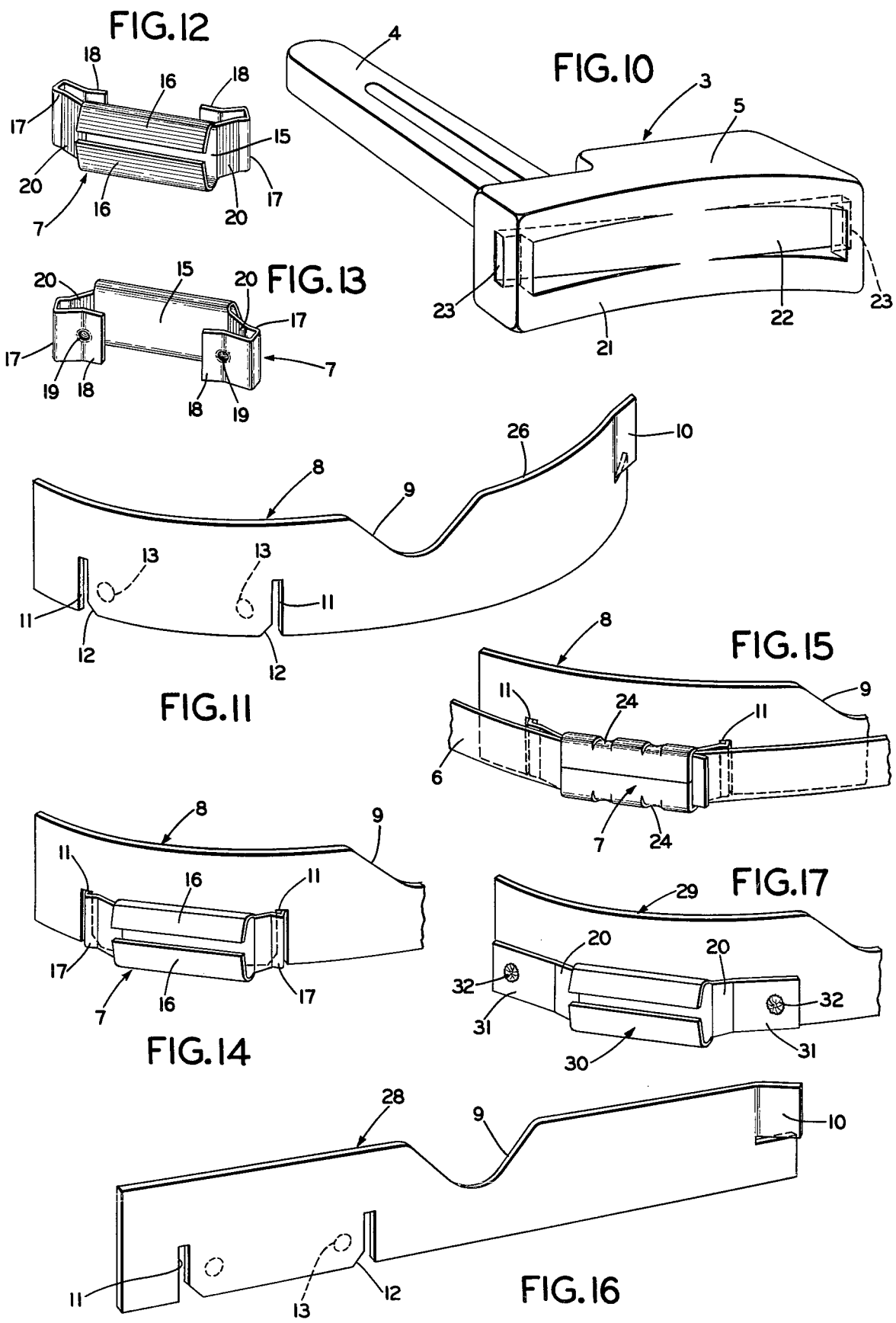

STRAPPING, SEAL AND COUNTERWEIGHT DEVICE FOR MOUNTING TIRE PRESSURE WARNING SYSTEM SENSORS ON TIRE RIMS

BACKGROUND OF THE INVENTION

1. Field of the Invention

The invention relates, generally, to low tire pressure warning systems for pneumatic tires mounted on the rims of automotive vehicle wheels. More particularly the invention relates to a device consisting of simple coordinated metal strapping, strapping seal and counterweight components used as a fixed mount for a known type of tire pressure sensor having a deflectable member and self-contained radio transmitter and power means within the drop-center of a tire rim without requiring modification of usual wheel rims so that the sensor may deflect within a tire mounted on a rim with each revolution of the wheel when the tire is going flat, to actuate the radio transmitter to broadcast low tire pressure alarm signals to a receiver located on the vehicle remotely of the wheel to thereby alert the vehicle operator.

The new device of the invention provides a metal strapping sensor mount that holds the sensor and its components in a fixed position in a drop-center rim and which strapping coincidentally mounts and holds the counterweight component of the device at a location on the rim to counterbalance the sensor. The counterweight and sensor thus are held securely by the new mounting device in fixed positions at all times and particularly during vehicle operation at speeds which may be somewhat in excess of normal, reasonable or lawful vehicle speeds.

The new device of the invention consists essentially of metal strapping, strapping seal, and counterweight components which are simple and inexpensive in construction, installation and use. Furthermore, the new device of the invention preferably is constructed so that only the strapping and seal are damaged, destroyed or discarded without loss of the counterweight when repairs of a flat tire are carried out at any place such as a usual tire repair service station. Thus, such service stations need only carry in stock usual metal strapping material and seals in addition to usual strapping tensioning and sealing tools, regardless of tire and rim size, thereby avoiding a requirement that each tire service station must maintain a stock of various sizes of counterweight components, in order to service tires and rims equipped with low pressure warning systems of the type described.

2. Description of the Prior Art

The problem of alerting a vehicle operator to the fact that a vehicle tire is going flat has existed for many years. Innumerable types and kinds of low pressure signaling devices have been proposed. These prior devices have utilized all kinds and types of sensors and signal transmitting means, including magnetic couplings, radio transmitters and receivers, and noise makers.

Tire and wheel balancing counterweights have been mounted exteriorly on rims. Counterweights have been held in place on a rim within the tire by an inflated inner tube pressing the counterweight against the rim. Other counterweights have been held by flexible bands spring tensioned about a rim so that the counterweights will move by centrifugal force outward radially of the wheel with each wheel revolution when a tire is going flat, and then snap back abruptly following such outward radial movements to produce a noise signal when striking the rim following snap-back.

Many types of sensors have been used involving deflection of a finger with each revolution of a tire going flat and having a powered radio transmitter activated by sensor finger deflection to transmit a warning signal. Such sensors have been mounted on wheel rims by bolts, welding or by elastic, stretchable or flexible bands with toggle latches for joining the ends of the bands. Also band tension adjusting means has been proposed for such flexible bands.

One example of a tire low pressure warning device is shown in Neu U.S. Pat. No. 3,154,048 which has a spring pressed bumper that is distorted or deflected each time it bumps the flattened road contacting portion of the tire when tire pressure drops during wheel revolution. The bumper is held in place on the rim by a flexible belt having a knocker which moves out radially by centrifugal force and snaps back against the rim during each revolution of the wheel when the bumper is distorted during low tire pressure conditions, thus producing a noise alarm.

The Hill et al U.S. Pat. No. 3,818,435 and the Church U.S. Pat. No. 3,835,451 each shows the same sensor of a type having self-contained power and radio transmitter components. These sensors are stated as being mounted on the rim with a threaded bolt or by welding. These sensors transmit low tire pressure signals when such low pressure occurs.

Snyder U.S. Pat. No. 4,117,452 also discloses a sensor having a deflectable finger and a self-contained radio transmitter. The sensor has mounting means consisting of a slotted bar engaged by pins and nuts carried by the rim for removably mounting the sensor on the rim. Alternatively, Snyder uses a flexible band to mount the sensor on the rim. The ends of the flexible band are joined with a toggle latch. Also, adjustment means to apply proper mounting tension to the flexible band is suggested.

All prior art low pressure warning devices of which I am aware have complicated structures which are difficult to install as new equipment at an automotive factory, or are difficult ato repair at a tire repair station in connection with repairing a flat vehicle tire. Further, the known prior art devices do not have a counterweight coordinated with a sensor of deflectable finger radio transmitter type by mounting and holding means which holds the sensor and counterweight in fixed relative positions during highway operation at speeds somewhat in excess of reasonable or lawful vehicle speeds.

Also, no known prior art device has any concept of a counterweight removably associated with the sensor mounting and holding means so that the counterweight is salvaged when the mounting means is damaged in connection with tire repair.

A need has long existed for a device for sensing and signaling the occurrence of low tire pressure during vehicle operation, which device includes a known type of deflectable radio transmitter contained sensor cooperatively removably assembled with a sensor counterweight; in which the sensor and counterweight are securely mounted on the tire rim and held in fixed positions in a drop-center tire rim with the counterweight oriented 180° with respect to the sensor, in which only the sensor and counterweight mounting or holding means is destroyed and replaced when necessary to repair a flat tire, and in which the sensor and counterweight are reused during such repair.

SUMMARY OF THE INVENTION

Objectives of the invention include providing a simple and inexpensive mounting device composed of few parts for attaching a low tire pressure sensor signaling device in fixed position in the drop-center of a typical automotive wheel rim without modifying the rim; providing such a mounting device with a counterweight which is installed at the same time as the sensor at a fixed location on the rim 180° from the sensor; providing such a mounting device in which the counterweight and sensor when installed are held fixed at installed locations during wheel rotation at extremely high speeds; providing such a mounting device comprising only steel strapping, a strapping seal and a counterweight, which may be installed at a factory or tire repair shop; providing such a mounting device in which the seal is mounted on the counterweight; providing such a mounting device preferably which permits the sensor and counterweight to be reinstalled during tire repair using usual strapping tools for tensioning and sealing new strapping and seals; and providing such mounting device which achieves the stated objectives in a most efficient and highly secure manner, and eliminates and solves problems and satisfies needs existing in the art.

These and other objects and advantages may be obtained by the new mounting device for mounting low tire pressure sensors on a tire rim, which may be stated as including a length of steel strapping material engageable with a sensor, a strip-like metal counterweight having a lengthwise contour different from rim curvature, and a strapping seal mounted on the counterweight; whereby the strapping engaged with the sensor with overlapped ends sealed by the seal and tensioned around the rim with usual strapping tensioning and sealing tools holds the sensor and counterweight in predetermined fixed positions on the rim within the tire at all reasonable wheel speeds.

BRIEF DESCRIPTION OF THE DRAWINGS

Preferred embodiments of the tire pressure warning system combined sensor and counterweight mounting device of the invention—illustrative of the best modes in which applicant has contemplated applying the principles—are set forth in the following description and shown in the drawings and are particularly and distinctly pointed out and set forth in the appended claims.

FIG. 3 is a much enlarged fragmentary view of the bottom portion of FIG. 1 showing the sensor and metal strapping portion of the mounting device;

FIG. 4 is a fragmentary view looking in the direction of the arrows 4—4, FIG. 3;

FIG. 5 is a fragmentary view looking in the direction of the arrows 5—5, FIG. 2;

FIG. 6 is a very much enlarged sectional view taken on the line 6—6, FIG. 2;

FIG. 10 is a perspective view of the sensor component shown in FIGS. 1, 3, 4, 7 and 8 which the improved mounting device of the invention mounts on a rim;

FIG. 11 is a perspective view of one form of a counterweight component of the improved sensor mounting device;

FIGS. 12 and 13 are perspective views, looking from different directions, of one form of strapping seal component of the improved sensor mounting device;

FIG. 14 is a fragmentary perspective view of the strapping seal of FIGS. 12 and 13 removably mounted on the counterweight of FIG. 11;

FIG. 15 is a fragmentary view similar to FIG. 14 but showing the strapping seal after being crimped as in FIGS. 2, 6 and 9 to seal the ends of metal strapping for mounting a sensor and counterweight in fixed positions on a rim;

FIG. 16 is a perspective view similar to FIG. 11 of another form of counterweight;

FIG. 17 is a view similar to FIG. 14 of a modified form of counterweight and strapping seal with the seal spot welded to the counterweight;

Similar numerals refer to similar parts throughout the various figures of the drawings.

DESCRIPTION OF THE PREFERRED EMBODIMENTS

First Embodiment

A typical vehicle wheel rim is indicated generally at 1, on which a tire, indicated generally at 2, is mounted. A typical known type of tire pressure sensor having a deflectable member with self-contained radio transmitter and radio power means desired to be mounted on the rim to provide a low tire pressure warning signal is indicated generally at 3.

The sensor transmitting means 3, as stated, may be a known type of sensor such as generally shown in U.S. Pat. No. 4,117,452, a similar type of sensor being shown in U.S. Pat. Nos. 3,818,435 and 3,835,451. The sensor 3 has a deflectable finger 4 and a housing 5 which contains a radio transmitter and power therefor, not shown.

Figure 1:
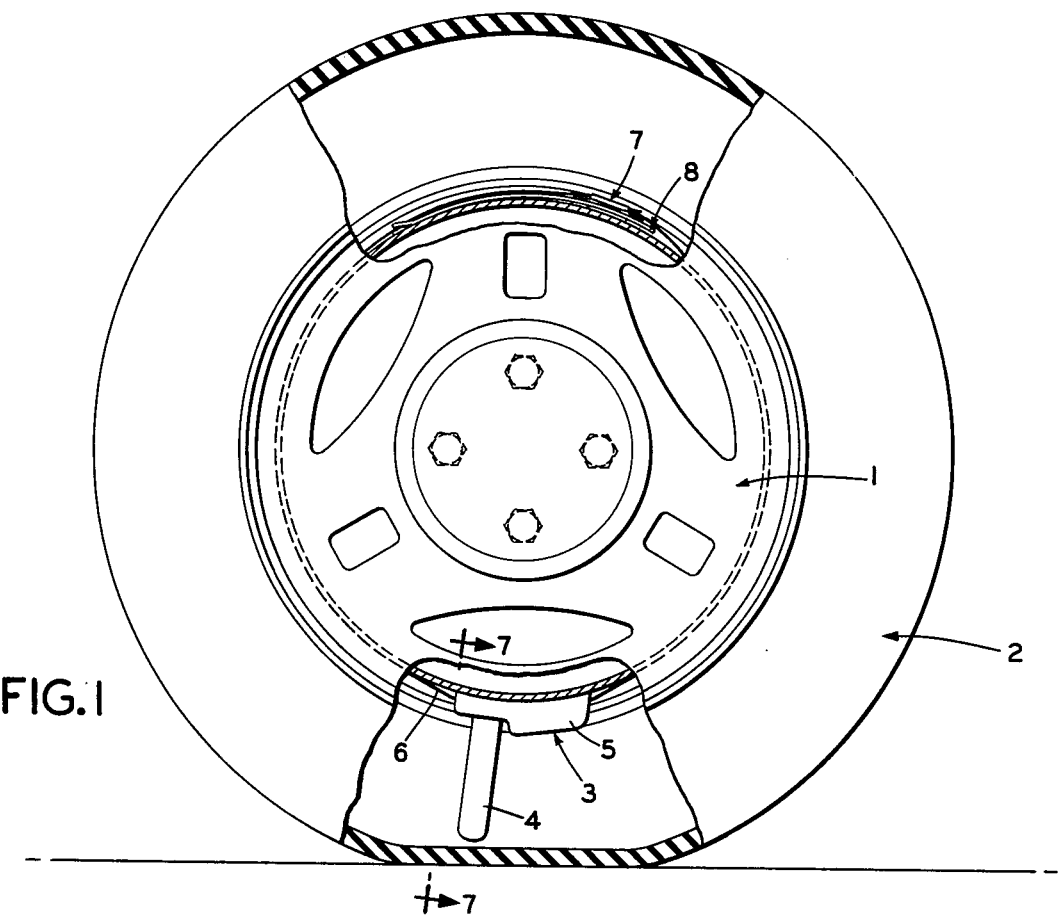
FIG. 1 is a side elevation, partly in section, of a vehicle wheel rim and properly inflated tire incorporating the device of the invention.
Figure 7:
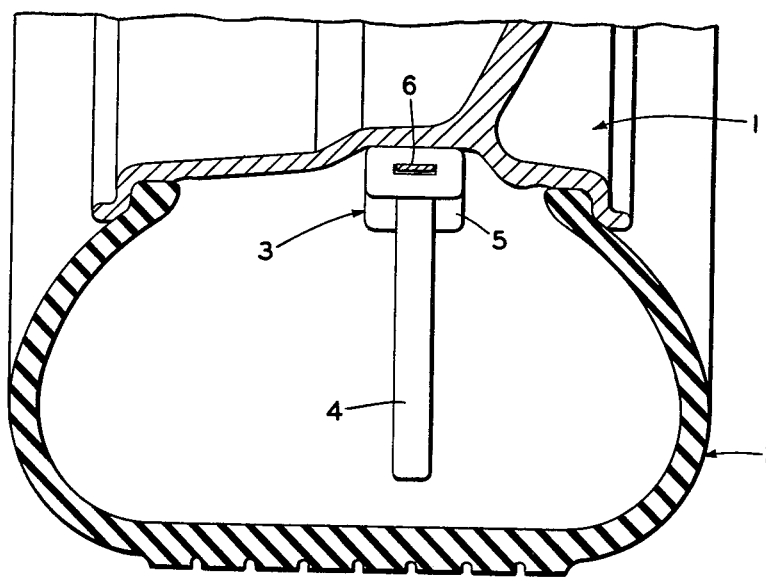
FIG. 7 is an enlarged sectional view taken on the line 7—7, FIG. 1.

When the tire 2 is properly inflated, the sensor 3 remains in the positions shown in FIGS. 1, 3 and 7. In a known manner, when the tire 2 becomes under-inflated, the sensor finger 4 (FIG. 8) engages the inside of the tire tread during each revolution of the wheel. This activates the radio to transmit a warning signal. The construction and operation of the sensor 4 of known types forms no type of the invention.

Figure 8:
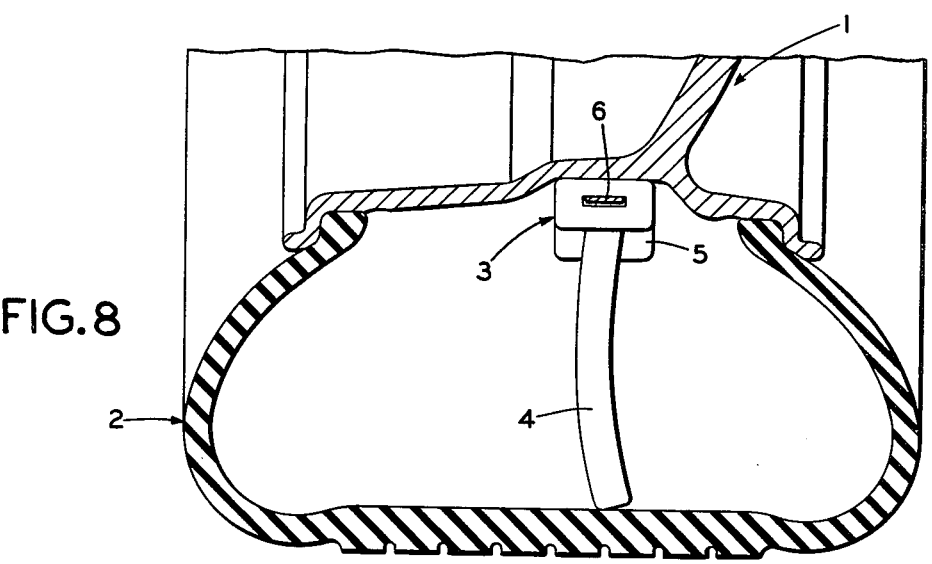
FIG. 8 is a view similar to FIG. 7 showing the sensor finger deflected when the tire pressure has been reduced to a degree that a signal of a low tire pressure condition is desired.

The invention involves a simple mounting construction or device having a minimum number of parts and suitable for both factory or field assembly with a rim, for mounting and holding a sensor 3 in fixed position at all times in the recess of a drop center type of tire rim 1 such as shown in FIGS. 7 and 8, and which mounting device at the same time mounts and holds a counterweight in the drop center of the rim 1 at a fixed position spaced 180° from the sensor 3 as shown in FIG. 1 to counterbalance the sensor 3.

In accordance with the invention, the sensor mounting device includes steel strapping generally indicated at 6, a strapping seal 7 and a counterweight generally indicated at 8.

The steel strapping 6 component of the mounting device is ½"×0.015" or ½"×0.020" strapping formed from 1015 carbon steel which has an elastic limit of 115,000 psi. Although, from the strength standpoint, ordinary steel strapping as described is satisfactory, it is preferred to use such steel strapping which has been electro-galvanized since the electro-galvanized strapping appears to assist in providing antenna properties for the radio signals transmitted from the sensor.

The seal 7 is suitably formed of strip steel with a strength of material falling in a range of 125,000 to 145,000 psi and with a 6 to 12% elongation. The shape of the seal, described below in connection with describing the seal 7 shown in FIGS. 12 and 13, is designed to permit the seal to be detachably mounted on either of the counterweights shown in FIGS. 11 and 16 without requiring any tools for such seal-counterweight assembly. The seal 7, when properly sealed to steel strapping 6 with a standard type down-cut sealer, will provide a minimum joint efficiency of 75% of the strapping used. The seal may be SAE 1050 carbon steel.

The counterweight 8 has a width, length and thickness designed to certain tolerances which can be altered by the addition or deletion of a series of holes so as to provide the proper counterbalance for the sensor being mounted. The counterweight preferably is formed of strip steel having a strength falling into the range of 115,000 to 225,000 psi. Mounting devices composed of the described strapping 6, seal 7 and counterweight 8 have been successfully tested to withstand forces not exceeding the elastic limit of the strapping and seal material, but forces therebelow that may be developed by vehicle speeds substantially in excess of normal or lawful speeds without failure of the strapping or seal.

In other words, such testing indicated that even at the speeds tested, the improved mounting devices of the invention held the sensors 3 and counterweights 8 in the fixed positions on the tire rim 1 where said sensors and counterweights were located when originally installed on the rim. That is to say further, the mounting device construction provides constant resistance to centrifugal and inertia forces to the applied strapping and proper joint strength at the seal.

Further, the counterweight 8, when placed 180° from a sensor 3 that is intended to provide a low tire pressure warning signal when strapped to a tire rim, always remains at the 180° position, thereby maintaining proper tire balance.

Referring to FIGS. 11 to 14, the counterweight 8 is curved lengthwise in shape and preferably is formed with a notch 9 along one edge, a bent ear 10 at one portion of one end and two spaced apart slots 11 with beveled corners 12 in an intermediate portion of the other end of the counterweight 8 beyond the notch 9. Indentations 13 are formed in the concave surface of the counterweight 8 adjacent the slots 11 and corners 12 as shown in dotted lines in FIG. 11 and in full lines in FIG. 9.

The counterweight notch 9 preferably is provided to span the opening 14 in the rim 1 (FIG. 5) for a tire valve when the counterweight 8 is mounted on the rim 1. In this manner, the counterweight's location and, therefore, the sensor's location at 180° from the counterweight is known and may be determined from the outside of an inflated or deflated tire.

Figure 9:
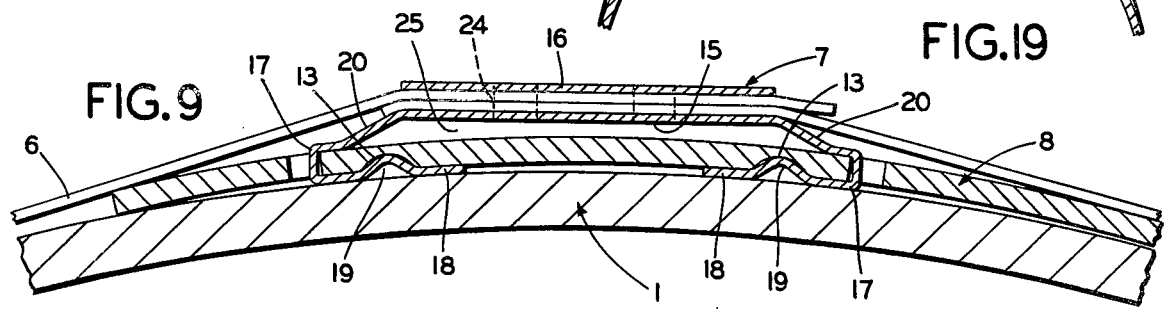
FIG. 9 is an enlarged sectional view looking in the direction of the arrows 9—9, FIG. 6.

The seal 7 is elongated and strip-like and has a central body portion 15 terminating at its edges in reversely bent U-shaped seal flanges 16 similar to typical known metal strapping seals. These seal flanges extend longitudinally of the body portion 15 and laterally toward each other as shown in FIG. 12, spaced above the body portion to form a seal channel. The body portion 15, however, is modified to terminate in reversely bent generally U-shaped ears 17 extending from the body portion ends of the seal 7. The tips 18 of the ears 17 are provided with indentations 19 and may be flared slightly away from the seal body portion 15 as well shown in FIGS. 12 and 13. The portions 20 of the U-shaped ears 17, which connect the ears 17 with the body portion 15, preferably extend angularly away from the body portion 15 as best shown in FIG. 9, for a purpose to be described.

A seal 7 may be assembled with a counterweight 8 as shown in FIG. 14 by sliding the U-shaped ears 17 of the seal 7 along the slots 11 of the counterweight 8. During this assembly step, the beveled corners 12 assist in entry of the ears 17 into the slots 11. When the seal 7 is in place, the seal tip indentations 19 snap into the counterweight indentations 13 as shown in FIG. 9. In this manner, a seal 7 is removably mounted on a counterweight 8. When the seal 7 is so mounted on a counterweight 8, the elongated seal extends longitudinally of the strap-like counterweight.

The underside of the housing portion 5 of sensor 3 is provided with a curved undersurface 21 (FIG. 10) matching the curvature of the drop-center portion of rim 1 (FIG. 3) and a channel 22 is formed in the housing undersurface connected with openings 23 in the housing ends.

In order to mount a sensor 3 on a rim 1, steel strapping material 6 is threaded through the openings 23 and channel 22 in the sensor 3 and the strapping material is inserted or extended through and has overlapped ends in the opening or passage or seal channel formed by the central body portion 15 and U-shaped seal flanges 16 of a seal 1 which previously has been assembled to a counterweight 8 (FIG. 14) as described.

Figure 18:
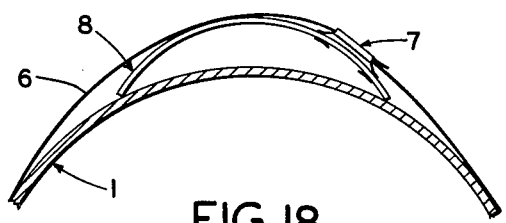
FIG. 18 is a fragmentary somewhat diagrammatic view illustrating a step in the assembly on a rim of the mounting device using the counterweight and seal of FIGS. 11 and 12 with steel strapping surrounding the rim before the strapping is tensioned and sealed to produce the sealed device shown in FIG. 9.

At this point in the assembly, the various components are in the positions generally depicted in FIG. 18. The counterweight 8 has a greater curvature than the curvature of the rim 1. At this time, the strapping is tensioned with usual strapping tensioning tools and sealers not shown but well-known in the art.

Figure 2:
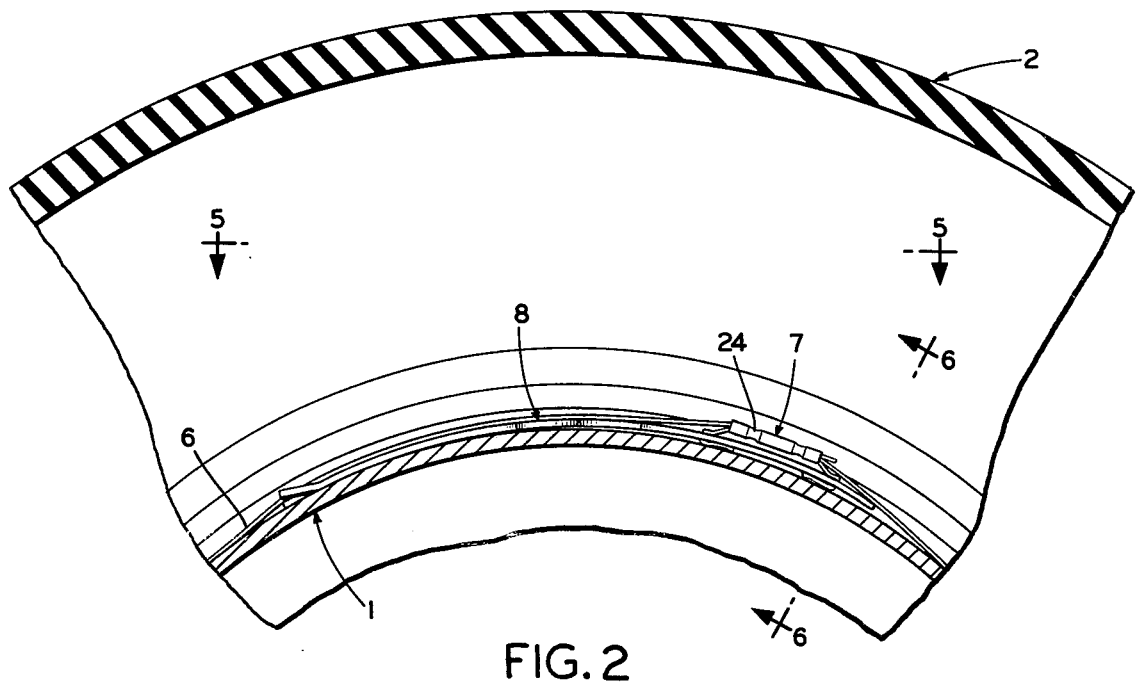
FIG. 2 is a much enlarged fragmentary view of the upper portion of FIG. 1 showing the strapping seal, counterweight and metal strapping which form the sensor mounting device of the invention.

During the strapping tensioning step performed by the tensioning tool, the counterweight 8 is drawn toward the rim so that its shape conforms to the shape of the rim as shown in FIG. 9. When the strapping has been properly tensioned by the tensioning tool, the sealer portion thereof is actuated to crimp the seal as best shown in FIGS. 2, 9 and 15, the crimps being indicated at 24. The strapping 6 engages over and along the counterweight as shown in FIGS. 9 and 15, after being tensioned and crimp sealed and after deforming the counterweight to conform generally with the rim curvature.

Referring to FIG. 9, the body portion 15 of the seal 7 is spaced from the counterweight 8, the space being indicated at 25. This space is formed because of the presence of the angular portions 20 of the U-shaped ears 17. The space 25 permits the fingers of a usual strapping sealer tool to engage under the body portion 15 of the seal to perform the seal crimping operation.

After the sealing operation has been performed, the deflection of the curvature of the counterweight 8 from its normal shape shown in FIGS. 11 and 18 to conform to the curvature of the rim 1 provides a spring or biasing function of the counterweight which holds the strapping 6 tensioned at all times thus holding the sensor 3 and counterweight 8 mounted in fixed positions on the rim 1 at all times.

As the strapping is being applied, the sensor 3 is positioned at 180° from the counterweight 8. As shown in FIGS. 5 and 6, during assembly of the mounting device, and the strapping of the counterweight 8 to the rim, the edge 26 of the counterweight 8 is located adjacent one corner 27 of the drop center of the rim 1. The bent ear 10 on the counterweight 8 guides the strapping 6 along the other edge of the counterweight 8 in the proper position to be fed to and enter the seal 7. In this manner, the strapping surrounds the rim generally centrally of the rim drop-center and holds the sensor 3 (FIGS. 4, 7 and 8) generally centrally of the rim drop-center.

The steel strapping 6 is flexible in the sense that it can assume positions necessary to be wrapped around the rim and to clamp, mount and hold the counterweight 8 and sensor 3 against the rim 1 in fixed positions. However, the strapping 6 does not have stretching or elastic flexibility when tensioned below its elastic limit. The strapping 6 cannot loosen from the rim until stretched beyond its elastic limit.

On the other hand, the sensor 3 is not bolted, welded or similarly joined to the rim as required by the prior art in mounting known sensors of the type shown and described.

The preferred form of mounting device described including steel strapping 6, a seal 7 and a counterweight 8, has a special advantage in that where a flat tire condition has been signaled and the tire requires repair at a repair shop, such repairs may require removal of the sensor which can be accomplished by cutting the strapping 6. Thereupon the seal 7 may be removed from the counterweight 8 and the counterweight 8 and sensor 3 used again in the field at a tire repair shop when assembling the repaired tire 2 on the rim 1.

The only requirement in the field when flat tires are repaired is that the repair shop have typical or usual strap tensioning and sealing tools, a supply of strapping material, and a supply of seals 7. The new strapping material 6 and seal 7 may be used regardless of the type and size of tire or rim. There is no requirement for stocking various sizes of counterweights and sensors for a variety of tire sizes and rims since the sensor and counterweight are reused.

Second Embodiment

Figure 19:
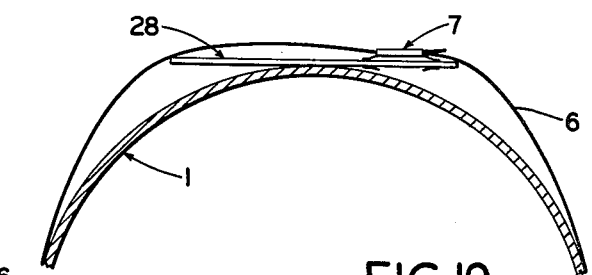
FIG. 19 is a view similar to FIG. 18 wherein the counterweight of FIG. 16 forms part of the improved mounting device assembly.

A second embodiment of the invention involves only a change in shape of the counterweight to that indicated at 28 in FIGS. 16 and 19. The counterweight 28 generally is identical to the counterweight 8 excepting that it is a flat strip rather than a curved strip. This avoids a forming or bending operation in the manufacture of counterweights to provide the counterweight 8 with curvature differing from the curvature of the rim 1.

The counterweight 28 in FIG. 16, which is flat or straight, has a shape differing from the curvature of the rim (FIG. 19) so that the counterweight 28 performs the same biasing functions as the counterweight 8, when drawn up by strapping 6 during tensioning and sealing of the strapping to provide a mounting device holding the sensor and counterweight in fixed positions on a rim.

Otherwise, the assembly and use of the counterweight 28, a seal 7 and strapping 6 is the same as described under the heading "First Embodiment".

Third Embodiment

In the form of the invention shown in FIG. 17, the counterweight 29 is similar in shape to either the counterweight 8 or the counterweight 28 excepting that the slots 11, the beveled corners 12 and the indentations 13 are omitted. The seal 30 is similar to the seal 7 excepting that the ears 31 are not U-shaped but extend outward from the angular connecting portions 20 and are spot welded at 32 to the counterweight 29. The assembly and operation of the combined counterweight and seal 29 and 30 wherein the seal is mounted on the counterweight, is identical to the other embodiments described under the headings "First Embodiment" and "Second Embodiment", excepting that the counterweight 29 cannot be reused. In such event, tire repair facilities must carry a stock of counterweights with seals welded thereto.

IN GENERAL

The lengthwise contour of the counterweight in all embodiments differs from the contour or curvature of the wheel rim so that the sealed and tensioned steel strapping is maintained tight at all times to hold the sensor and counterweight at the predetermined fixed positions on the rim where located when installed.

For example, for a 13 inch rim the counterweight may be a generally 8"×1.125"×0.080" SAE 1050 carbon steel strip with the strip either flat as in FIG. 16 or formed with about a 4" radius of curvature or contour, as in FIG. 11.

The new mounting device of the invention when installed consists of an assembly of steel strapping, a strapping seal and a counterweight wherein the seal is mounted on a counterweight and is sealed to the strapping so that the three components are held together as a unit, the counterweight interacting between the rim and the strapping material to hold the mounting device against slipping on the rim. In this manner, as stated, both the counterweight and the sensor mounted by the mounting device are held in fixed positions on the rim and their relative positions 180° apart, established during installation, is maintained.

The seal in all embodiments is mounted on the counterweight, being fixed to the counterweight in one embodiment and being removably mounted thereon in other embodiments.

It is important to note that plastic strapping sometimes used in other arts for tying or joining objects surrounded by such strapping cannot be used as a component of a mounting device for a low tire pressure sensor. The reason for this is that if a wheel on which plastic strapping is assembled for the desired purpose is operated at high speed, centrifugal force will stress and stretch the plastic strapping material and the strapping will slip relative to the rim. Conceivably, at very high speed such stretching could be enough to permit the sensor to move radially outward permitting its finger to contact the inner surface of the tire during each wheel revolution even though the tire actually is not underinflated.

Accordingly, the new mounting device is characterized by the concept of a counterweight cooperatively assembled with a strapping seal that seals and tensions steel strapping which mounts and securely holds a sensor of the deflectable finger type in fixed position in a drop-center rim and also holds the counterweight fixed and oriented at 180° with respect to the sensor location; and which mounting device satisfies the objectives stated, eliminates difficulties heretofore encountered in the art, and solves problems and satisfies a need that has existed in the art.

In the foregoing description, certain terms have been used for brevity, clearness and understanding but no unnecessary limitations are to be implied therefrom beyond the requirements of the prior art because such terms are used for descriptive purposes and are intended to be broadly construed.

Moreover, the description and illustration of the several embodiments of the invention is by way of example, and the scope of the invention is not limited to the exact details shown or described.

Having now described the features and principles of the invention, the manner in which the new mounting device is constructed, installed and functions, the preferred characteristics of the components of the mounting device, and the advantageous, new and useful results obtained; the new and useful structures, devices, components, elements, arrangements, uses and relationships are set forth in the appended claims.

I claim:

1. A mounting device for mounting a low tire pressure sensor transmitting means on a selected portion of a tire rim of a vehicle wheel including, a length of steel strapping conforming to the shape of the rim and engageable with a sensor having first and second strap ends; a strip-like metal counterweight having a lengthwise contour different from the curvature of a tire rim on which said sensor is to be mounted properly tensioned by said steel strapping; an elongated strip-like metal strapping seal having a body portion terminating in ears extending from the ends of the body portion, the body portion also terminating at its edges in reversely bent U-shaped seal flanges extending longitudinally of the body portion and laterally toward each other spaced above the body portion to form a seal channel; the seal ears being mounted on the counterweight with the elongated seal extending longitudinally of the strip-like counterweight; the first and second ends of the steel strapping being overlapped in and extending through said seal channel; and the strapping being engaged over and along the counterweight; whereby when the strapping engaged with a sensor is tensioned around a rim and the seal crimped by a strapping and sealing tool, the counterweight is deformed to conform generally with the rim curvature, and the sensor and counterweight are held in predetermined fixed relative positions on the rim within a tire mounted on the rim at all times and at all reasonable wheel speeds.

2. The device set forth in claim 1 in which the counterweight normally is curved lengthwise with a radius of curvature less than that of a rim around which the sealed strapping and counterweight are to be tensioned; and in which, when the strapping is tensioned around such rim, the counterweight contour conforms to that of the rim.

3. The device set forth in claim 1 in which the curvature of a rim around which the sealed strapping and counterweight are to be tensioned is greater than that of the lengthwise contour of the counterweight; and in which, when the strapping is tensioned around such rim, the counterweight contour conforms to that of the rim.

4. The device set forth in claim 3 in which the counterweight is flat lengthwise before being mounted on a rim.

5. The device set forth in claim 1 in which the metal strapping is formed of $\frac{1}{2}''\times 0.015''$ to $\frac{1}{2}''\times 0.020''$ SAE 1015 carbon steel, and in which the seal and counterweight are formed of SAE 1050 carbon steel.

6. The device set forth in claim 5 in which the strapping is electro-galvanized steel strapping.

7. The device set forth in claim 1 in which the seal is removably mounted on the counterweight.

8. The device set forth in claim 1 in which the seal is spot-welded to the counterweight.

9. The device as set forth in claim 1 in which the seal ears are connected with the body portion by angular portions to provide a space between the body portion and counterweight when the seal is mounted on the counterweight.

10. The device set forth in claim 9 in which the ears extend outward from the angular portions and are spot-welded to the counterweight.

11. The device set forth in claim 9 in which one end of the counterweight is formed with spaced slots extending laterally from one edge thereof, and in which the seal ears are reversely bent and engaged in said slots to removably mount the seal on the counterweight.

12. The device set forth in claim 11 in which the counterweight and seal ears are provided with indentations which are engaged with each other to locate the seal at a predetermined position on the counterweight when removably mounting the seal on the counterweight.

13. The construction set forth in claim 1 in which one edge of the counterweight is formed with a notch for locating the counterweight at a predetermined location on a rim when the device is installed on such rim.

14. The device set forth in claim 1 in which one end of the counterweight is formed with a bent ear to locate strapping with respect to the counterweight and seal when strapping ends are overlapped within the seal channel prior to being sealed by a sealing tool.

* * * * *